United States Patent Office 2,773,075
Patented Dec. 4, 1956

2,773,075
CHEMICAL COMPOUNDS AND PROCESSES OF PREPARING THE SAME

Evelyn H. Wilson, East Orange, and Max Tishler, Westfield, N. J., assignors to Merck & Co., Inc., Rahway, N. J., a corporation of New Jersey No Drawing. Application May 18, 1951,
Serial No. 227,102

10 Claims. (Cl. 260—397.45)

This invention is concerned generally with allopregnane compounds and with processes for preparing them. More particularly, it relates to the novel compound, $\Delta^1$-3,11,20-triketo-17$\alpha$-hydroxy-21-acetoxy-allopregnene and with the novel process of preparing this compound starting with $\Delta^4$-3,11,20-triketo-17$\alpha$-hydroxy-21-acetoxy-pregnene (cortisone acetate).

The new compound, $\Delta^1$-3,11,20-triketo-17$\alpha$-hydroxy-21-acetoxy-allopregnene, may be chemically represented as follows:

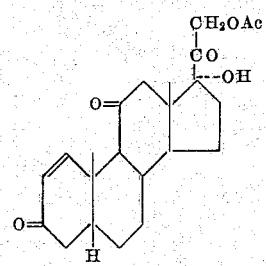

$\Delta^1$-3,11,20-triketo-17$\alpha$-hydroxy-21-acetoxy-allopregnene has been demonstrated to possess pharmacological activity similar to that shown by cortisone and is thus of value in the treatment of conditions which heretofore responded to the administration of the adrenal hormone, cortisone.

The $\Delta^1$-3,11,20-triketo-17$\alpha$-hydroxy-21-acetoxy-allopregnene, subject of the present invention, can be prepared by reacting $\Delta^4$-3,11,20-triketo-17$\alpha$-hydroxy-21-acetoxy-pregnene (Compound 1 hereinbelow) with hydrogen thereby producing 3,11,20-triketo-17$\alpha$-hydroxy-21-acetoxy-allopregnane (Compound 2). The latter compound is then brominated to form 2-bromo-3,11,20-triketo-17$\alpha$-hydroxy-21-acetoxy-allopregnane (Compound 3), which is then reacted with a dehydrohalogenating agent to produce $\Delta^1$-3,11,20-triketo-17$\alpha$-hydroxy-21-acetoxy-allopregnene (Compound 4).

The reactions indicated hereinabove may be chemically represented as follows:

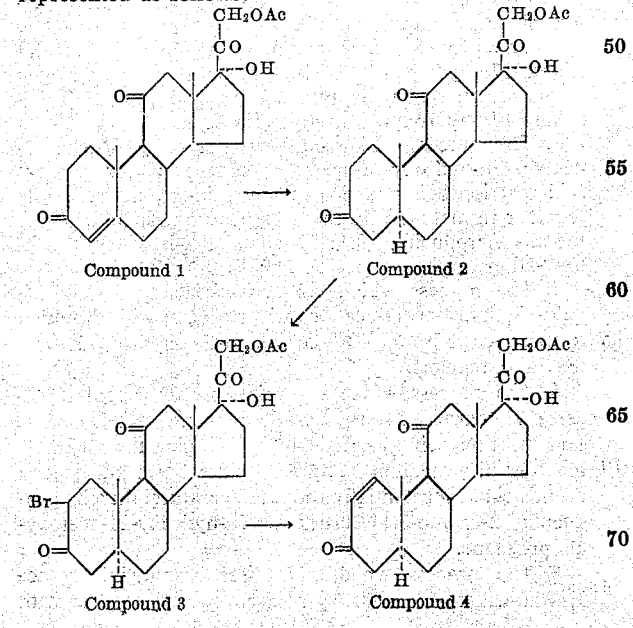

The reaction between $\Delta^4$-3,11,20-triketo-17$\alpha$-hydroxy-21-acetoxy-pregnene and hydrogen is carried out by bringing the reactants together in the presence of a solvent for the pregnene compound in the presence of palladium oxide catalyst. As solvent, we utilize a lower aliphatic alcohol such as methanol. We ordinarily prefer to carry out the hydrogenation at approximately room temperature utilizing hydrogen at a pressure of about 40 pounds per square inch under which conditions absorption of hydrogen is substantially complete in approximately one-half hour. The hydrogenation mixture contains both 3,11,20-triketo-17$\alpha$-hydroxy-21-acetoxy-allopregnane and its $C_5$-epimer, 3,11,20-triketo-17$\alpha$-hydroxy-21-acetoxy-pregnane. The desired allopregnane compound is conveniently recovered from the hydrogenation mixture containing the two epimers by filtering said mixture to remove the catalyst, evaporating the filtered reaction mixture to dryness, and crystallizing the residual material from acetone whereby the desired 3,11,20-triketo-17$\alpha$-hydroxy-21-acetoxy-allopregnane separates from the acetone solution in the form of white needles. If desired, the epimeric 3,11,20-triketo-17$\alpha$-hydroxy-21-acetoxy-pregnane can be recovered from the acetone mother liquors.

The bromination of the 3,11,20-triketo-17$\alpha$-hydroxy-21-acetoxy-allopregnane is conducted by dissolving the allopregnane compound in a solvent inert to bromine and adding bromine to the resulting solution. It is ordinarily preferred to carry out the bromination at room temperature by adding a solution of bromine in glacial acetic acid, dropwise, to a solution of the 3,11,20-triketo-17$\alpha$-hydroxy-21-acetoxy-allopregnane in a mixture of chloroform and glacial acetic acid containing a small amount of hydrogen bromide. The product is recovered from the bromination mixture by evaporating the solvent and recrystallizing the product from a solvent such as ethyl acetate.

The dehydrobromination of the 2-bromo-3,11,20-triketo-17$\alpha$-hydroxy-21-acetoxy-allopregnane thus formed can be carried out, if desired, by reacting this compound with a tertiary amine such as pyridine, collidine, and the like. It is preferred, however, to utilize 2,4-dinitrophenylhydrazine and pyruvic acid as the dehydrobrominating agent. When the latter reagent is used, the 2-bromo-3,11,20-triketo-17$\alpha$-hydroxy-21-acetoxy-allopregnane is preferably brought into contact with the 2,4-dinitrophenylhydrazine in a medium comprising glacial acetic acid, at a temperature of about 50–55° C. The intermediate 2,4-dinitrophenylhydrazone of $\Delta^1$-3,11,20-triketo-17$\alpha$-hydroxy-21-acetoxy-allopregnene is conveniently recovered from the glacial acetic acid reaction mixture by diluting the latter with water and cooling, whereupon the hydrazone compound crystallizes as an orange solid, which is recovered by filtration and dried. The crude hydrazone, thus obtained is then heated with a solution of pyruvic acid in acetic acid at an elevated temperature of approximately 80–85° C. At this temperature, the hydrolysis of the hydrazone is ordinarily complete in less than one hour, but the hydrolysis reaction is preferably carried out for a period of about five to six hours. The product is conveniently recovered from the hydrolysis solution by evaporating the latter to small volume and diluting the residual solution with chloroform. The by-product impurities which precipitate are separated from the resulting solution by filtration, and the chloroform filtrate is then washed with water and aqueous alkaline solution to remove additional impurities. This chloroform solution can then be evaporated, if desired, to obtain $\Delta^1$-3,11,20-triketo-17$\alpha$,21-dihydroxy-pregnene. It is ordinarily preferred, however, to treat the chloroform solution with an acylating agent, such as acetic anhydride and pyridine, thereby acylating the 21-hydroxy substituent. The acylated product is readily separated from the chloroform solution by conventional means, and purified by recrystallization from a solvent such as ethyl acetate to give substantially pure $\Delta^1$-3,11,20-triketo-17$\alpha$-hydroxy-21-acetoxy-allopregnene.

The following examples illustrate methods of carrying out the present invention, but it is to be understood that these examples are given for purposes of illustration and not of limitation.

Example 1

Six-hundred milligrams of palladium oxide and 12 cc. of an 0.001 N aqueous solution of potassium hydroxide were added to a suspension of 7.25 g. (0.018 mole) of $\Delta^4$-3,11,20-triketo-17$\alpha$-hydroxy-21-acetoxy-pregnene (cortisone acetate) in 600 cc. of methanol. The mixture was then reacted with hydrogen at a pressure of approximately 40 pounds per square inch while maintaining the temperature of the reactants at approximately room temperature. The absorption of hydrogen ceased after approximately one-half hour; the amount of hydrogen absorbed corresponded to 1 mole. The reaction mixture was filtered, thereby removing the catalyst, and the catalyst was washed thoroughly with chloroform. A few drops of ethanolic hydrogen chloride were added to the combined filtrate and washings, and the resulting solution was evaporated to dryness in vacuo. The residual material was dissolved in chloroform, and the solution was again evaporated to dryness. The residual material was then recrystallized twice from acetone to give 6.2 g. of substantially pure 3,11,20-triketo-17$\alpha$-hydroxy-21-acetoxy-allopregnane which was obtained in the form of white needles; M. P. 229–233° C.; yield approximately 43% of theory $[\alpha]_D^{24°} = +100°$ (0.2% in chloroform). Analysis—Calc'd for $C_{23}H_{32}O_6$: C, 68.29; H, 7.97. Found: C, 68.46; H, 7.68. The melting point of a mixture of this compound and an authentic sample of the $C_5$ epimer, 3,11,20-triketo-17$\alpha$-hydroxy-21-acetoxy-pregnane (M. P. 225° C.) was depressed to 214–220° C.

Example 2

Five hundred cc. of reagent glacial acetic acid were added to a solution containing 5.51 g. (0.0136 mole) of 3,11,20-triketo-17$\alpha$-hydroxy-21-acetoxy-allopregnane dissolved in 50 cc. of chloroform. A few drops of a 1.3 N solution of hydrogen bromide in acetic acid were added, and the resulting solution was stirred while adding thereto, dropwise at room temperature, a solution containing 0.0139 mole of bromine dissolved in 19 cc. of glacial acetic acid. The reaction solution was evaporated to dryness in vacuo at a temperature of 25–35° C. The residual material was triturated with low-boiling petroleum ether, and the insoluble material was recovered by filtration and recrystallized from ethyl acetate to give approximately 4.5 g. of 2-bromo-3,11,20-triketo-17$\alpha$-hydroxy-21-acetoxy-allopregnane; M. P. 167–170° C. (dec.); yield approximately 68.5% of theory; $[\alpha]_D^{24°\ C.} = +102°$ (0.5% in chloroform).

Example 3

A mixture of 4.35 g. (0.009 mole) of 2-bromo-3,11,20-triketo-17$\alpha$-hydroxy-21-acetoxy-allopregnane, 2.2 g. of 2,4-dinitrophenylhydrazine and 125 cc. of glacial acetic acid, was heated, with agitation under a nitrogen atmosphere for a period of approximately three hours at a temperature of approximately 50–55° C. Three hundred and seventy-five cubic centimeters of distilled water were added to the reaction mixture, and the resulting mixture was cooled and maintained at a temperature of about 0° C. for a period of approximately two hours. The orange solid which precipitated was recovered by filtration, washed well with water and air dried, to give the crude 2,4-dinitrophenylhydrazone of $\Delta^1$-3,11,20-triketo-17$\alpha$-hydroxy-21-acetoxy-allopregnene.

This crude hydrazone was mixed with 175 cc. of 90% aqueous pyruvic acid and 35 cc. of glacial acetic acid, and the mixture was heated under nitrogen, with agitation, at a temperature of about 80–85° C. for a period of approximately five and one-half hours. (A clear solution was obtained after heating the mixture for a period of approximately forty-five minutes.) The reaction solution was evaporated in vacuo to a small volume, and the residual solution was diluted with a large quantity of chloroform. The solid material which precipitated was removed by filtration, and the chloroform filtrate was extracted with two portions of water, with three portions of dilute aqueous potassium bicarbonate solution, and finally with another portion of water. The washed chloroform solution was then evaporated to one-half its initial volume at approximately atmospheric pressure.

To the dark chloroform solution thus obtained were added 20 cc. of acetic anhydride and 5 cc. of pyridine. The resulting solution was maintained at approximately room temperature for a period of about fifteen hours. The reaction solution was then shaken with water, and the chloroform layer was washed successively with a 2.5 N aqueous solution of hydrochloric acid, with water, with dilute aqueous potassium bicarbonate solution, and finally with water. The washed chloroform solution was dried over anhydrous calcium sulfate (Drierite), and the dry chloroform solution was then passed through a column containing 100 g. of acid-washed alumina. The chloroform eluates from the initial solution and washings were combined and treated with activated charcoal (Norit), filtered and the filtered solution was evaporated to dryness in vacuo. The residual material was recrystallized from ethyl acetate to give 900 mg. of $\Delta^1$-3,11,20-triketo-17$\alpha$-hydroxy-21-acetoxy-allopregnene which was obtained in the form of fine white needles; M. P. 253–256° C. (dec.); $[\alpha]_D^{24°\ C.} = +115°$ (0.2% in chloroform); $\lambda_{max.}$ $C_2H_5OH$ 2270 A.; Log E 4.06. Analysis—Calc'd for $C_{23}H_{30}O_6$: C, 68.63; H, 7.51. Found: C, 68.53; H, 7.66.

Various changes and modifications may be made in carrying out the present invention without departing from the spirit and scope thereof. Insofar as these changes and modifications are within the purview of the annexed claims, they are to be considered as part of our invention.

We claim:

1. The process of preparing $\Delta^1$-3,11,20-triketo-17$\alpha$-hydroxy-21-acetoxy-allopregnene which comprises reacting $\Delta^4$-3,11,20-triketo-17$\alpha$-hydroxy-21-acetoxy pregnene with hydrogen in the presence of palladium catalyst thereby producing 3,11,20-triketo-17$\alpha$-hydroxy-21-acetoxy-allopregnane, reacting the latter compound with bromine to form 2-bromo-3,11,20-triketo-17$\alpha$-hydroxy-21-acetoxy-allopregnane, and reacting said 2-bromo-3,11,20-triketo-17$\alpha$-hydroxy-21-acetoxy-allopregnane with a dehydrohalogenating agent.

2. The process which comprises reacting $\Delta^4$-3,11,20-triketo-17$\alpha$-hydroxy-21-acetoxy-pregnene with hydrogen in the presence of palladium catalyst to produce 3,11,20-triketo-17$\alpha$-hydroxy-21-acetoxy-allopregnane.

3. The process which comprises reacting $\Delta^4$-3,11,20-triketo-17$\alpha$-hydroxy-21-acetoxy-pregnene with hydrogen, said reaction being carried out by bringing the reactants together in methanol in the presence of palladium oxide, thereby producing 3,11,20-triketo-17$\alpha$-hydroxy-21-acetoxy-allopregnane.

4. The process which comprises reacting 3,11,20-triketo-17$\alpha$-hydroxy-21-acetoxy-allopregnane with bromine to produce 2-bromo-3,11,20-triketo-17$\alpha$-hydroxy-21-acetoxy-allopregnane.

5. The process which comprises reacting 3,11,20-triketo-17$\alpha$-hydroxy-21-acetoxy-allopregnane with bromine, said reaction being carried out by bringing the reactants together in a medium comprising chloroform and glacial acetic acid at substantially room temperature, thereby producing 2-bromo-3,11,20-triketo-17$\alpha$-hydroxy-21-acetoxy-allopregnane.

6. The process which comprises reacting 2-bromo-3,11,20-triketo-17$\alpha$-hydroxy-21-acetoxy-allopregnane with a dehydrohalogenating agent to produce $\Delta^1$-3,11,20-triketo-17α-hydroxy-21-acetoxy-allopregnene.

7. The process which comprises reacting 2-bromo-3,11,20-triketo-17α-hydroxy-21-acetoxy-allopregnane with 2,4-dinitrophenylhydrazine in a medium comprising glacial acetic acid, and reacting the 2,4-dinitrophenylhydrazone thus formed with pyruvic acid to produce $\Delta^1$-3,11,20-triketo-17α-hydroxy-21-acetoxy-allopregnene.

8. 3,11,20 - triketo - 17α - hydroxy - 21 - acetoxy - allopregnane.

9. 2 - bromo - 3,11,20 - triketo - 17α - hydroxy - 21-acetoxy-allopregnane.

10. $\Delta^1$ - 3,11,20 - triketo - 17α - hydroxy - 21 - acetoxy-allopregnene.

References Cited in the file of this patent

UNITED STATES PATENTS

| | | |
|---|---|---|
| 2,231,018 | Marker | Feb. 11, 1941 |
| 2,257,137 | Strassberger | Sept. 30, 1941 |
| 2,260,328 | Miescher | Oct. 28, 1941 |
| 2,441,560 | Butenandt | May 18, 1948 |
| 2,492,195 | Sarett | Dec. 27, 1949 |

OTHER REFERENCES

Grasshof: Zeit. Physiol Chem., 223, page 249 (1934).
Sarett, JACS 71, pp. 2443–44 (1949).